United States Patent [19]
Joyce

[11] Patent Number: 5,435,716
[45] Date of Patent: Jul. 25, 1995

[54] GAS-FIRED HEATERS WITH BURNERS HAVING A SUBSTANTIALLY SEALED COMBUSTION CHAMBER

[76] Inventor: John V. Joyce, 19 Minkara Rd., Bayview NSW 2104, Australia

[21] Appl. No.: 255,092

[22] Filed: Jun. 7, 1994

Related U.S. Application Data

[63] Continuation-in-part of Ser. No. 997,899, Dec. 29, 1992, Pat. No. 5,317,992.

[30] Foreign Application Priority Data

Dec. 30, 1991 [AU] Australia .............................. PL0213

[51] Int. Cl.$^6$ ................................................ F23D 3/40
[52] U.S. Cl. ........................................ 431/7; 431/329; 126/361; 122/17
[58] Field of Search ................ 431/328, 329; 126/361; 122/17, 14

[56] References Cited

U.S. PATENT DOCUMENTS

| | | | |
|---|---|---|---|
| 2,345,677 | 4/1944 | Koppel | 122/17 |
| 2,621,720 | 12/1952 | Dufault | 158/99 |
| 2,782,780 | 2/1957 | Bourner | 126/89 |
| 3,336,914 | 8/1967 | Ruhl | 126/90 |
| 3,353,528 | 11/1967 | Robinson | 126/91 |
| 3,733,170 | 5/1973 | Kobayashi et al. | 431/329 |
| 4,314,542 | 2/1982 | Bratko | 431/328 |
| 4,491,092 | 1/1985 | Charron et al. | 122/18 |
| 4,492,185 | 1/1985 | Kendall et al. | 122/32 |
| 4,510,890 | 4/1985 | Cowan | 122/17 |
| 4,548,163 | 10/1985 | Siedhoff | 122/13 R |
| 4,608,012 | 8/1986 | Cooper | 431/328 |
| 4,641,631 | 2/1987 | Jatana | 126/101 |
| 4,672,919 | 6/1987 | Staats | 122/13 R |
| 4,737,102 | 4/1988 | Jinno et al. | 431/328 |
| 4,782,815 | 11/1988 | Friedman et al. | 126/361 |
| 4,790,268 | 12/1988 | Eising | 122/17 |
| 4,793,800 | 12/1988 | Vallett et al. | 431/328 |
| 4,867,106 | 9/1989 | Staats | 122/13 R |
| 4,925,093 | 5/1990 | Moore, Jr. et al. | 237/19 |
| 4,940,042 | 7/1990 | Moore, Jr. et al. | 126/344 |
| 4,953,511 | 9/1990 | Bosh et al. | 122/18 |
| 4,993,402 | 2/1991 | Ripka | 126/361 |
| 5,022,352 | 6/1991 | Osborne et al. | 122/17 |
| 5,044,353 | 9/1991 | Mizuno et al. | 126/91 A |
| 5,115,798 | 5/1992 | Moore, Jr. et al. | 126/351 |
| 5,139,415 | 8/1992 | Schwank | 431/242 |
| 5,355,841 | 10/1994 | Moore et al. | 431/328 |

*Primary Examiner*—Carroll B. Dority

[57] ABSTRACT

A gas-fired combustion apparatus includes a porous combustion surface disposed in a combustion chamber substantially sealed to prevent entry of secondary air and having a pressure relief means that operates to relieve or suppress pressure changes which may otherwise occur in the combustion chamber with commencement of the burner operation. Thereafter a subatmospheric pressure is maintained in the combustion chamber by a natural or aspirated draft. The subatmospheric pressure cooperates with an aspirating flow of fuel to the burner apparatus to provide an increased flow of primary combustion air which reduces the combustion temperature and the emission of pollutants. Alternatively, the subatmospheric pressure may be used to achieve a given flow of primary combustion air with a reduced combustion surface area. Water heater applications of the burner apparatus are illustrated.

23 Claims, 3 Drawing Sheets

GAS-FIRED HEATERS WITH BURNERS HAVING A SUBSTANTIALLY SEALED COMBUSTION CHAMBER

This is a continuation-in-part of U.S. patent application Ser. No. 997,899, filed Dec. 29, 1992, now U.S. Pat. No. 5,317,992, dated Jun.7, 1994. The present invention relates to heaters, and more particularly, to gas-fired heaters, in which combustion occurs within a sealed or substantially sealed combustion chamber including a noise suppression device for inhibiting low frequency resonant vibrations. In an illustrated embodiment, the noise suppression device comprises a combustion chamber volume change or pressure relief device to control combustion onset resonance.

BACKGROUND OF THE INVENTION

RELATED ART

The present invention is particularly advantageous in connection with gas-fired heaters having a sealed combustion chamber and a burner having a porous combustion surface that is supplied with a combustible air/fuel mixture by aspiration. The invention is illustrated hereafter with respect to residential hot water heaters.

In such water heaters, the primary air flow exceeds the stoichiometric ratio and no secondary air is required to complete the combustion. This is advantageous since secondary air generally complicates the combustion process, leading to nonuniform combustion areas which are hotter or cooler than the average. Such non-uniformity of combustion leads to localized production of undesirable combustion products, particularly carbon monoxide (CO) and the oxides of nitrogen ($NO_x$).

In order to reduce the production of $NO_x$, various types of water heaters have been provided with infrared burners supplied with sufficient primary air to establish complete combustion. Typically, such units employ a powered fan or blower to establish the air/fuel mixture supplied to the infrared burner, or fans or blowers located at the exhaust of the unit to induce flow of the combustion products. U.S. Pat. Nos. 4,492,185 and 4,993,402 illustrate water heater units having infrared burners combined with powered mechanical fans or blowers.

It is also known to provide a water heater utilizing an infrared burner in which combustion is achieved without the use of secondary air and in which powered blowers or fans are not used to induce the flow of the air/fuel mixture or the combustion products. The U.S. Pat. No. 4,510,890 discloses such a unit. In that patent, a water heater is described having a vertically extending, side-mounted infrared burner. A flue stack is connected to the combustion chamber at a location spaced from the upper and lower ends of the combustion chamber. Such flue stack is angulated to the axial center of the tank, and thereafter, extends vertically to its discharge end.

As described in co-pending application Ser. No. 997,889, which is incorporated herein in its entirety, when it is necessary to achieve high burner loading in a relatively small space, maintaining low $NO_x$ emissions becomes even more difficult as increased loading tends to increase the combustion temperature and carbon monoxide and $NO_x$ concentrations in the products of combustion. Substantially sealing the combustion chamber overcomes this tendency by causing a subatmospheric pressure condition in the combustion chamber sufficient to pull excess primary air through the burner to cool the flame and reduce the emissions of carbon monoxide and $NO_x$ to low levels. However, substantially sealing the combustion chamber also exacerbates the tendency of burners operating in combustion chambers to produce a resonance or combustion noise upon ignition of combustion. This resonance can persist for long times and can be unacceptably loud. The tighter the seal, the louder the noise, and the more difficult it becomes to control it.

It is the object of the present invention to overcome the disadvantages of the existing technology, specifically the elimination of low resonance frequency noise observed when the gas-fired heater is initially placed into operation.

SUMMARY OF THE INVENTION

As indicated, the present invention contemplates a method and device for accommodating or suppressing pressure fluctuations within a sealed or substantially sealed combustion chamber. Specifically, a gas-fired combustion apparatus or heater having a sealed or substantially sealed combustion chamber including a pressure relief device that operates to relieve or suppress pressure changes which may otherwise occur in the combustion chamber with commencement of the burner operation.

The advantages of a sealed or substantially sealed combustion chamber in water heater applications are described in co-pending application Ser. No. 997,889. However, it was realized in certain cases that as the percent sealing of the combustion chamber was increased towards 100% there was a combustion onset resonance frequency associated with ignition and operation of the gas burner. It is theorized that when a gas-fired heater is first placed into operation and the burner is lit there is an initial rapid expansion of the air/gas mixture in the combustion chamber. The expansion occurs so rapidly that the inertia of the column of air in the flue pipe or exhaust pipe open to the atmosphere is unable to accelerate fast enough to remove all of the expanding gases. As a result the pressure in the combustion chamber increases during a high pressure start-up cycle and restricts the flow of the air/fuel mixture from the air duct or venturi so as to inhibit combustion as well as the formation of combustion products and commence a low pressure start-up cycle. The increase in pressure in the combustion chamber may in fact cause the air/fuel mixture to flow backwards. This causes the burner flame to greatly decrease in intensity and may even force the flame to extinguish. Once the hot combustion gases in the combustion chamber have had sufficient time to overcome the inertia of the gases in the flue pipe, they will have moved up the flue pipe, causing the low pressure cycle to exist in the combustion chamber. The low pressure cycle or vacuum created will rapidly draw in the air/fuel mixture causing rapid expansion of the flame and the hot gases will result in a pressure increase, thereby starting the high pressure cycle over again.

The pressure relief device allows for the increase of pressure in the combustion chamber caused by the inertia of the air in the flue pipe or exhaust port to be relieved and not restrict the flow of the air/fuel mixture, thereby greatly reducing or completely eliminating the noise that the hot water heater makes when engaged, and inhibiting non-uniform flow of the combustible air/fuel mixture through the porous member to the combustion surface. Although the combustion surface is generally maintained at subatmospheric pressure during burner operation in accordance with the teachings of co-pending application Ser. No. 997,889, the initial ignition results in periods of fluctuation in pressure which in turn cause the undesirable resonant frequency described above.

Thereafter, there exist little fluctuation in the pressure and the combustion chamber exist in a subatmospheric pressure as described herein and as described in the U.S. patent application Ser. No. 997,889, filed Dec. 29, 1992, now U.S. Pat. No. 5,317,992, dated Jun. 7, 1994.

As described above the fluctuation in air pressure causes a low resonance frequency to be observed. The low resonance frequency is best characterized as a rumbling. Although over an extensive period of time the low resonance frequency will dissipate, most gas-fired heaters are not in continual operation, and the resonance frequency occurs each time the burner is placed into operation.

Many attempts were made to dampen the noise. Initially one frequency around 1000 to 2000 hertz was observed. This was removed with a layer of insulation. A second very loud frequency resonance below 100 hertz, closer to 50 hertz was then observed. As structural modification were made to the gas-fired heater to increase combustion, the frequency shifted to approximately 200 hertz which can be absorbed by the insulation. Finally, there remained a low frequency rumbling noise that was in the range of 1–10 hertz. It was further observed that the low frequency noise corresponded to increase and decrease in flame intensity within the chamber.

The pressure relief device of the present invention may comprise a volume change device that varies the volume of the combustion chamber in response to pressure changes. The pressure relief device may comprise a vent device that allows high pressure gas flow from the combustion chamber, but substantially restricts flow in the opposite direction.

In a first embodiment, the pressure relief device comprises a flexible diaphragm or membrane which expands in response to the increase in pressure in the combustion chamber thereby relieving the internal pressure. When the inertia of the column is finally overcome by the volume of hot air/gas mixture in the combustion chamber the combustion chamber gas products flow out the flue pipe creating subatmospheric operating conditions. If a flexible diaphragm is used, the subatmospheric conditions tend to draw the flexible material comprising the diaphragm or membrane inwardly, therefore it may be necessary to protect the diaphragm from areas of elevated temperatures exceeding the temperature stability of the elastic material.

In a second embodiment, the pressure relief device comprises a porous material that closes an opening in a wall of the combustion chamber. The porous material has a resistance to gas flow therethrough that is overcome by the high pressure cycles associated with the resonance encountered during burner start-up. However, flow from the environment into the combustion chamber is substantially restricted by the porous material during low pressure cycles during start-up as well as subatmospheric conditions during steady-state operation. A glass-fiber bat may be used to provide adequate gas flow resistance with a minimum amount of air ingress.

The burner is readily installed in the customary burner space typically used in residential water heaters with minimal modifications. Accordingly, the cost savings resulting from the above described burner size reduction are further increased by the cost reductions associated with reduced tooling and fabrication changes.

DETAILED DESCRIPTION OF THE PREFERRED EMBODIMENT

Figure 1:
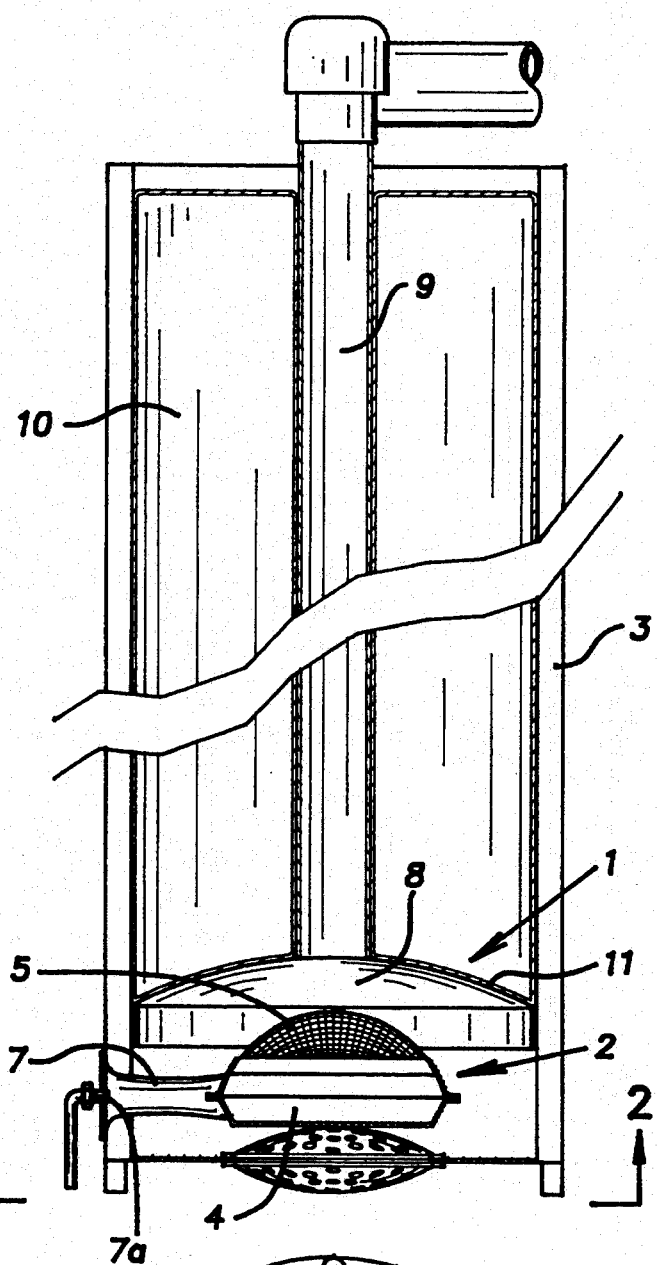
FIG. 1 is a schematic longitudinal sectional view of a water heater having a burner according to the invention.
Figure 2:
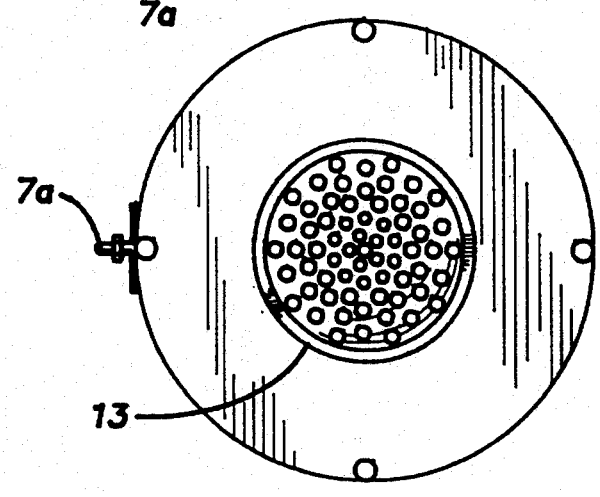
FIG. 2 is a schematic plan view of the water heater and burner shown in FIG. 1, taken along line 2—2 of FIG. 1.

Referring to FIG. 1, heater 1 includes a gas-fired burner or combustion unit 2 having a combustion surface 5 housed within the base of a water heater 3. The combustion surface 5 is generally horizontally mounted and centered within the base of the water heater.

As shown best in FIG. 3, the combustion unit 2 includes a plenum chamber 4 positioned below the burner combustion surface 5 and an air/fuel mixing and delivery device comprising an air duct 7. The air duct may be in the form of a venturi as shown or in the form of a cylindrical tube or pipe. The cross-sectional area of the air duct should be sufficiently large to minimize pressure flow losses relative to the subatmospheric pressure driving force above the combustion surface 5. Gaseous fuel, such as natural gas, enters the air duct 7 from a nozzle 7a and aspirates or induces environmental air to enter the plenum chamber 4 with the fuel. In this manner, the air duct 7 operates in response to the flow of fuel to aspirate and combine environmental air with the fuel to form a combustible air/fuel mixture which is delivered to the plenum chamber 4 at a plenum pressure.

Nozzle 7a is preferably positioned approximately one inch away from the plane of the mouth of the air duct 7. It has been determined that improved results are achieved if the entrance of the air duct is open to the exterior of the heater shell. Further, the air duct allows excessive primary air to mix with the fuel in the plenum 4. The majority of the primary combustion air is provided by the driving force of the subatmospheric pressure maintained above the combustion surface 5.

Combustion chamber 8 is in fluid communication, via pores in the burner combustion surface 5, with the plenum chamber 4, which in turn is in fluid communication with the air duct 7. Air duct 7 provides at least partial mixing of the air and fuel, which is completed within the plenum chamber 4. The burner combustion surface 5 is preferably made of wire mesh, and is more preferably made of inconel 601 wire mesh. Burner combustion surface 5 may also be made of other heat resistant porous materials, such as ceramics.

The burner is operated at conditions which result in primarily convective heat transfer, e.g. 70% to 80% or more, and reduced emissions of pollutants. To that end, the combustion or flame temperature is maintained in the range of 600° to 900° C. by the use of excess primary combustion air. Generally, the excess air is in the range of from about 110% to about 200% in order to maintain the desired combustion temperatures. The combustion loading of the burner surface may range from about 500 to about 2,000 MJoules/m$^2$ hr. These operating conditions are discussed in applicant's U.S. patent application Ser. No. 891,155, filed May 28, 1992, now issued U.S. Pat. No. 5,340,305, dated Aug. 23,1994 claiming priority of U.S. Ser. No. 598,021, filed Oct. 16, 1990, now abandoned, and Australian Application 64743/90, dated Oct. 20, 1989 and published Apr. 26, 1991, and related Provisional Application PJ7000, filed Oct. 20, 1989. These operating conditions reduce the NO$_2$ emissions to less than about 5 ng/joule and provide a CO/CO$_2$ ratio of less than about 0.003. Accordingly, the outdoor ventilation of the flue products is not required. Such combustion temperatures also favor convective heating over radiant heating so that the burners provide primarily convective heat transfer. Heretofore, burners having combustion surfaces were operated at significantly higher temperatures to promote radiant heat transfer. The lower temperature operating conditions also increase the selection of suitable materials for the diaphragm or membrane because this material must be able to withstand the temperatures that exist in various locations within the combustion chamber.

The burner combustion surface 5 is disposed within a substantially sealed combustion chamber 8. Combustion chamber 8 may enclose the burner element 2, or the burner element 2 may be attached to the bottom wall 12 of the combustion chamber, whereby burner combustion surface 5 constitutes a portion of the inner wall of chamber 8. Chamber 8 is sufficiently sealed to prevent entry into the combustion chamber 8 of secondary air in quantities which could adversely affect burner operation. Combustion chamber 8 has an opening 13 preferably located in the lower wall 12 which is covered by a pressure relief device such as diaphragm 13a that is substantially impermeable to gas flow. The diaphragm 13a covering the opening 13 utilizes a resilient non-porous deformable material, such as, butyl rubber, natural rubber, silicone rubber, vinyl polymers, urethane polymers, polyethylene plastic or teflon. The resilient non-porous deformable material must meet the high temperature requirements of the combustion chamber 8, and can be evaluated using the following criteria: flexibility, low cost, high temperature rating, ease of manufacture, and durability. The criteria is not absolute and if the material that the diaphragm 13a is made from meets one or more of the criteria it may be suitable. Silicone rubber is used in the preferred embodiment because of its flexibility, relatively low cost, ease of manufacture (injection molding), and because it satisfies the high operating temperatures of the combustion chamber. The flexibility of the diaphragm of course is effected by the diameter of the opening 13 and the thickness of the diaphragm 13a and a suitable thickness ranges is 0.1 to 0.3

The diaphragm 13a has structural support in perforated protective covers 14a and 14b located on each side of the flexible diaphragm 13a. The perforated protective covers 14a and 14b have perforations 15 which allow the diaphragm to be in fluid communication with the combustion chamber and the outside environment.

It may be desirable to position on the lower wall 12 of the combustion chamber 8, insulation 12a which performs two functions. First, it reduces noise during burner operation, second, it reduces heat loss through wall 12. Additionally the insulation may be placed over the diaphragm 13a and inner protective cover 14a to shield the diaphragm 13a from excessive heat, thereby allowing the use of elastic material that would be damaged otherwise. This is shown in phantom by line I. In this manner desirable materials which meet the criteria above may be used even though they are damaged at high combustion chamber temperature. The distance between the plenum chamber 4 and the diaphragm 13a may also be adjusted to avoid intense heat and increase the selection of diaphragm materials.

The diaphragm 13a is adapted to move in response to variations in the pressure of the chamber and may be considered a volume change device. The diaphragm 13a of the present invention adjusts the volume of the combustion chamber 8 in response to pressure fluctuations in the combustion chamber 8. The inward or outward contraction or expansion of the diaphragm causes the hot water tank to make less noise by suppressing or dampening pressure fluctuations that exist in the combustion chamber 8 upon burner start-up. The pressure relief device such as the membrane or diaphragm 13a and the perforated protective covers 14a and 14b may be of one piece so that hot water tanks or the like can be retroactively fitted with a snap in design that would lead to the benefits of the present invention.

Flue stack 9 constitutes an opening to the environmental air. Thus, as used here in relation to combustion chambers, "sealed" or "closed" refers to minimizing entry of secondary air into the combustion chamber relative to the amount of primary air. "Sealed" or "substantially sealed" also refers to the condition that exists when the combustion gases within the combustion chamber 8 are not in fluid communication with the outside environment to a degree sufficient to adversely affect the combustion products and limitation of pollutants.

Figure 3:
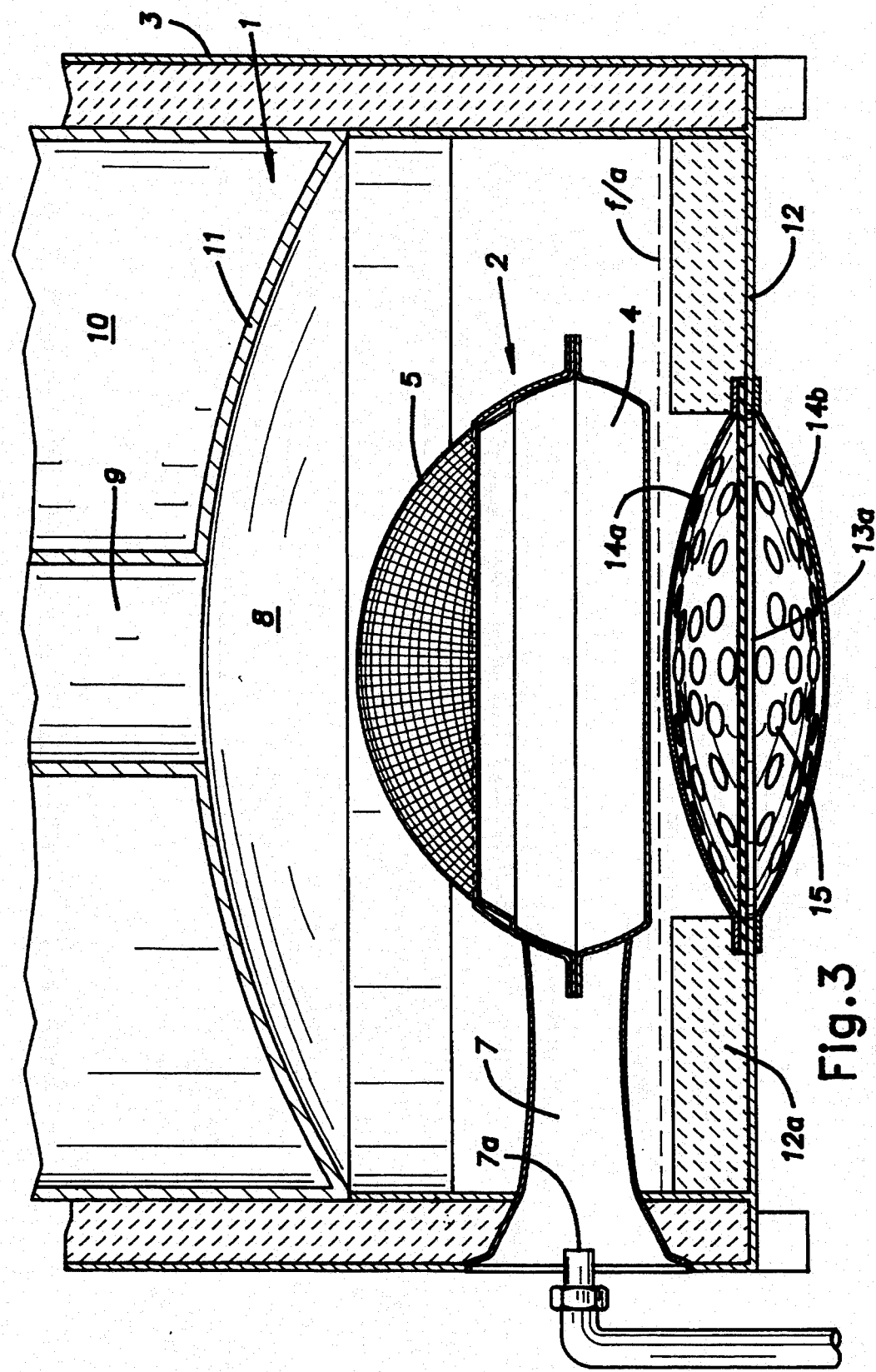
FIG. 3 is an enlarged fragmentary side elevation of the first embodiment of the burner and combustion chamber portion of the unit.

As best shown in FIG. 3, flue stack 9 extends vertically upward from an upper dome-shaped wall surface 11 of the combustion chamber 8 through the center of the water tank 10. The flue stack may extend above the water heater to increase the natural draft and further decrease the subatmospheric pressure in the combustion chamber 8. The dome-shaped upper wall 11 functions to guide the combustion products into the flue stack 9. Further, the domed-shaped upper wall 11 operates as a heat exchange surface since it is part of the water tank.

The domed-shaped upper wall 11 of the combustion chamber 8 is in direct heat exchange relationship with the water within the water heater and its concave, domed shape accommodates the upward flow of the combustion products from the combustion chamber 8 into a vertically extending flue stack 9. The combustion chamber 8 and flue stack 9 are structured so that the natural draft results in the flow of the buoyant combustion products up through the flue stack 9 and produces a subatmospheric pressure (e.g. 0.015 inches water column) within the combustion chamber 8. This facilitates the flow of fuel and primary air through the burner and the combustion surface so that a given size burner operates at a higher loading than the same burner would operate if the combustion chamber 8 were maintained at atmospheric pressure. This permits the manufacture of a water heater of a given rating with a smaller size burner than would be possible if the combustion chamber were at atmospheric pressure.

Flue stack 9 may also contain baffle device (not shown) to improve efficiency of heat transfer from combustion gases to the water. The baffle should be designed to reduce frictional flow losses in the flue stack 9.

Figure 4:
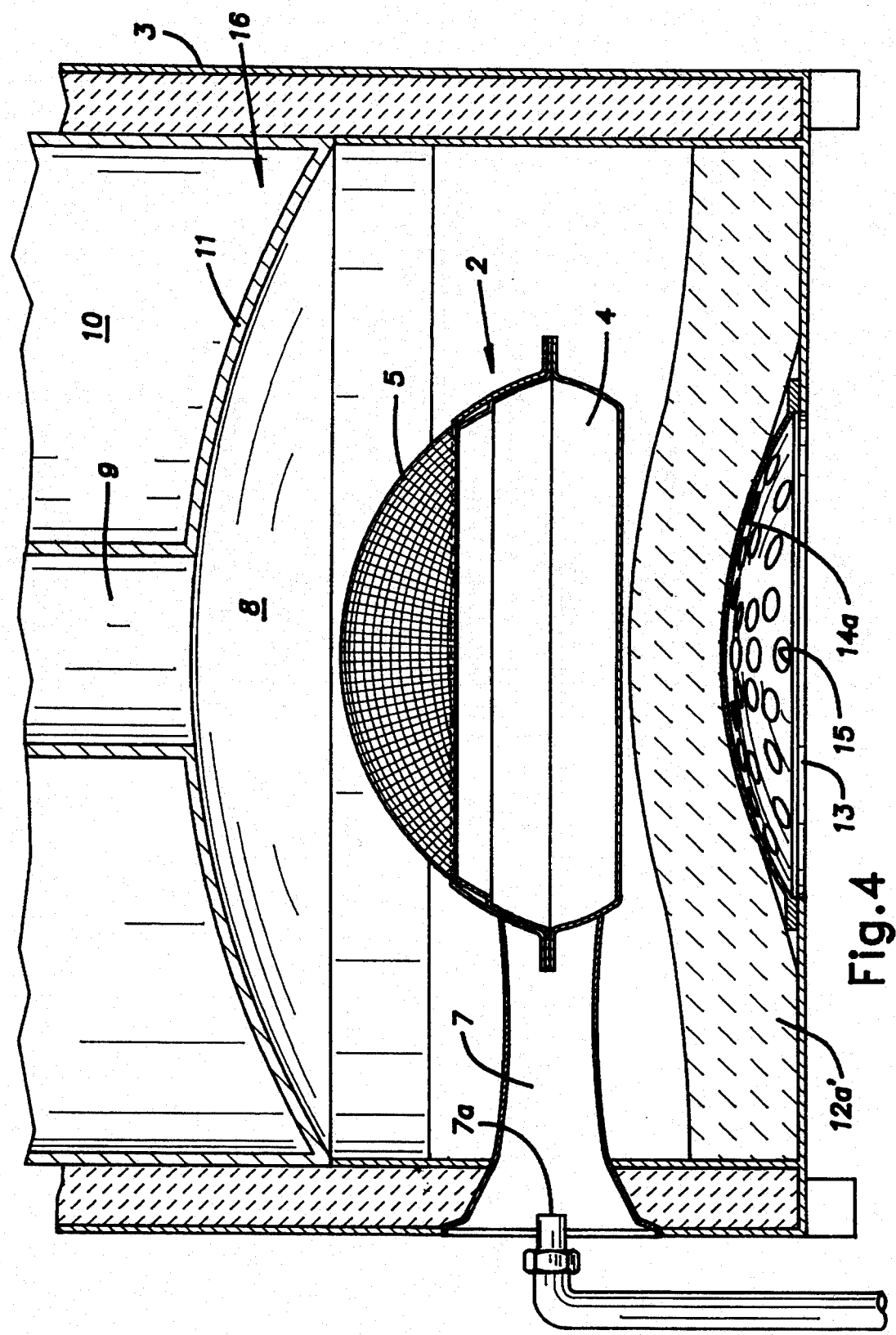
FIG. 4 is an enlarged fragmentary side elevation of the second embodiment of the burner and combustion chamber portion of the unit showing the layer of insulation.

The second embodiment of the present invention is shown in FIG. 4. This embodiment is similar to that shown in FIG. 3 and for convenience, similar elements are identified with the same number and elements that have been modified are indicated by a prime symbol ('). The same or similar elements operate in the manner discussed above.

The heater 16 has a combustion unit 2 which as discussed above includes a plenum chamber 4 positioned below the burner combustion surface 5 and an air/fuel mixing and delivery device comprising an air duct 7. Combustion chamber 8 is sufficiently sealed to minimize the entry of secondary air relative to the amount of primary air, and to prevent entry into the combustion chamber 8 of secondary air in quantities which could adversely affect burner operation. In this embodiment combustion chamber 8 has an opening 13 with a perforated upper protective cover 14a and a perforated lower protective cover 14b on each side of the opening 13. A layer of porous material 12a is layered over the bottom wall 12 and upper perforated protective cover 14a. The porous material 12a' may be a fibrous mat or glass fiber mat. For example, a suitable glass fiber mat may be provided by stripping the backing from a one inch thick bat of glass fiber sold under the mark Durablanket®S (density of 8 lbs/cu. foot) by Ohio Industrial Sales Inc. As shown in FIG. 4, the porous material 12a' has a diameter sufficient to cover the entire bottom wall 12 which has in this example a diameter of 16 inches. The porous material 12a' also completely covers the opening 13 which has a diameter of 8 inches.

It is believed that the porous material 12a' has enough resistance to gas flow therethrough or exhibits a sufficient pressure drop that at the low subatmospheric pressure needed for good combustion and steady state operation one may achieve the desired flow of primary air through the air duct 7 while maintaining the combustion chamber in a substantially sealed condition because very little, if any, secondary air is drawn through the porous material 12a'. However the pressure increase that may exist during burner start-up is relieved through the porous material, and therefore the porous material 12a' serves as a pressure relief device. It is believed that the pressure drop across the porous material 12a' is greater than that across the burner and the air duct 7 in combination. It is theorized that the relatively large diameter opening 13 i.e. eight inches, covered with the relatively thin porous material 12a', i.e. one inch thick allows the pressure increase to be released through the porous material 12a' while the small diameter and long distance of the air duct prevent the pressure wave from easily escaping through the air duct 7 and inhibiting air/fuel flow as described above. In other words the resistance to gas flow through the porous material 12a' is less than through the combination in series of the screen 5 and the air duct 7 which results in the porous material 12a' covering the opening 13 acting as a pressure relief device.

The perforated protective covers 14a and 14b have perforations 15 which cause the porous material 12a to be in fluid communication with the combustion chamber and the outside environment. The perforated protective covers 14a and 14b also prevent unwanted displacement of the porous material 12a. The perforated protective covers 14a and 14b may be replaced by a single foranious web support or rigid screen (not shown).

In a typical water heater in which the lower portion of the combustion chamber is open to environmental air and the burner has been extinguished between heating cycles, cool air is drawn through the combustion chamber and flue stack by the buoyancy of air heated by the hot water contained in the water heater 3. Such air cools the heated water, resulting in passive losses and reduced efficiency.

By sealing the combustion chamber, entry of such unheated air is substantially prevented. The only exception is a small amount of air passing through the air duct 7. Thus, providing a sealed combustion chamber further reduces passive heat losses by restricting the influx of cool air during interim, shutdown periods.

Furthermore, the positioning of the flexible membrane or diaphragm 13a on the lower wall 12 is very advantageous. First, combined with the insulation 12a the flexible diaphragm 13a reduces the noise to a point that it is barely, if at all, audible. Also, positioning of the flexible membrane or diaphragm 13a at the bottom of the tank on the lower wall 12 allows the membrane 13a to exist in the coolest place in the combustion chamber 8. The temperature directly below the plenum chamber 4 is not as hot as the rest of the chamber because of the buoyancy of the hot air/gas products and the positioning of the pressure relief device in the lower wall 12 prevents the diaphragm 13a from being damaged and provides for the longest life of the diaphragm 13a.

Air duct 7 is adapted to deliver and at least partially mix air and fuel having an air component at least equal to 110% of the stoichiometric amount. In this embodiment of the present invention, the preferred amount of air mixed with fuel in the air duct exceeds the stoichiometric amount by approximately 20 to 100% in order to lower the combustion temperature and the $NO_x$ emissions to the desired level.

Excess air is used in the present invention to maintain the combustion temperature in the range from 600°–900° C., and to assure complete combustion of fuel, thereby to maintain a low level of undesirable emissions from the combustion. The excess air is primary air, since it is mixed with the fuel entering the combustion element via the air duct 7. Excess air mixed with fuel as primary combustion air acts to reduce the level of undesirable emissions below that obtained when secondary air is allowed to enter. At the lower range of excess air (e.g. 10%), the quantity of CO is reduced by providing complete combustion of carbon to $CO_2$. At the higher range of excess air (e.g. 100%), the combustion temperature is lowered to the point that CO production begins to increase. The excess air inhibits formation of $NO_x$ by maintaining a low combustion temperature. Secondary air, on the other hand, causes a nonuniform combustion process, and results in increased emissions due to resulting hot and cool zones on the combustion surface. Generally, hot zones create excess $NO_x$; cool zones create excess CO.

The natural draft as described above acts to pull more air through the burner surface than would pass without the particular configuration employed in this invention and copending U.S. patent application Ser. No. 997,889. The increased air flow increases the percentage of excess air and lowers the combustion temperature and $NO_x$ emissions. An atmospheric pressure driven burner operating without the benefit of such natural draft could not achieve the benefits obtainable from the instant invention. The present result is obtained by increasing the pressure drop across the burner combustion surface.

Instead of using natural draft to increase air flow, the air flow can be held at a desired stoichiometric ratio, and the combustion surface area can be reduced. A smaller combustion surface area, having fewer pores or openings, restricts the flow of air/fuel mixture more than a larger area with more openings. In a smaller element there will be a greater resistance to flow of the same volume of air/fuel mixture. Thus with the present invention the same amount of air and fuel is passed through the smaller area with natural draft being used to overcome the greater resistance to flow. The burner 2 has been demonstrated at a heat input resulting in a combustion loading of 1644 MJ/hr m². An equivalent rated burner operating without a sealed combustion chamber in the same water heater producing substantially the same $NO_x$ emissions had a combustion loading of about 500 MJ/hr m². In this manner the natural draft effect enables reduction of the combustion surface area by a factor of more than 3 and results in a significantly lower cost for manufacture of the burner.

A further advantage of the use of the presently disclosed burners in combination with the natural or aspirated draft effects and the pressure relief device is in reduction size of the air/fuel mixing device, which is preferably embodied by an air duct, but which may also be a venturi, and the reduction of noise emission and maintenance of substantially uniform flow of the combustible air/fuel mixture by use of the pressure relief device. For example, in a standard water heater a burner having comparable combustion element rating or combustion loading, but without the benefit of natural or aspirated drafts, would require a venturi approximately 10 inches in length to provide sufficient mixing of fuel and air to sustain smooth, even combustion. In the present invention, the air duct preferably used has a length of only about 4.5 inches, a reduction of over fifty percent in length of the air/fuel delivery device from the non-draft burner having a comparable burner rating. Such a reduction is possible because the draft acts to increase flow of air and fuel through the combustion surface for smooth, even combustion thereof.

Finally, there is opportunity for further savings in operating costs due to potential increases in the heating efficiency of these heaters and other similar devices.

The following example is provided as illustration, and is not intended to limit the scope of the present invention in any manner.

The following demonstrates operation of a water heater at preferred conditions in accordance with parent application Ser. No. 997,889. In this water heater, the combustion surface is made of inconel 601 wire screen, and has a diameter of 6.6 inches and thickness of 0.014 inches. The air/fuel mixture contained approximately 20% excess air, above the stoichiometric amount. The combustion element was installed in a 40 gallon residential water heater. Three modifications were made to the water heater: (1) the combustion zone, bound by the bottom pan, inner skirt and inner door, was sealed to reduce secondary air, (2) a mat of insulation was placed on the floor shield to eliminate resonance noise and reduce heat loss as well as prevent damage to the silicone rubber diaphragm, and (3) the flue stack baffle was replaced with a baffle designed to provide efficient heat transfer without excessive air flow reduction. In the following chart, tests 1 and 2 display results obtained with two levels of natural gas input. Test 3 is a duplicate of test 2, used to compare consistency of results.

TABLE

| Test No. | BTU/hr Input | ppm CO | ppm $NO_x$ | ppm NO | ppm $NO_2$ | % Rec. Eff. |
|---|---|---|---|---|---|---|
| 1 | 34,770 | 45 | 9.0 | 7.1 | 1.85 | 68 |
| 2 | 31,500 | 54 | 9.0 | 6.64 | 2.36 | 73 |
| 3 | 31,500 | 54 | 9.0 | 6.64 | 2.36 | 73 |

The foregoing water heater was modified to include a diaphragm of flexible material mounted integrally within the floor shield as described in the first embodiment. Various diameter and thickness parameters were tested. The mat of insulation placed on the floor shield also served to prevent damage to the diaphragm. The following chart reports the time it took to stabilize the combustion onset low resonance frequency for the tested diaphragms.

| DIAPHRAGM EVALUATION | | | |
|---|---|---|---|
| Material | Diameter | Thickness | Stabilize Time |
| Polyethylene | (8") | (0.0008") | 0.5 s |
| Silicone (Conical) | 75 mm | 0.35 mm | Unstable |
| Silicone Rubber | 85 mm | 0.35 mm | Unstable |
| Silicone Rubber | 100 mm | 0.15 mm | Unstable |
| Silicone Rubber | 140 mm | 0.2 mm | Unstable |
| Silicone Rubber | 120 mm | 0.3 mm | 8 s > 10 s |
| Silicone Rubber | 120 mm | 0.25 mm | 5 s > 8 s |
| Silicone Rubber | 120 mm | 0.15 mm | 2 s > 5 s |
| Silicone Rubber | 180 mm | 0.35 mm | 5 s > 8 s |
| Silicone Rubber | 180 mm | 0.3 mm | 3 s > 5 s |
| Silicone Rubber | 180 mm | 0.25 mm | 2 s > 3 s |
| Silicone Rubber | 180 mm | 0.2 mm | 1 s > 2 s |
| Silicone Rubber | 180 mm | 0.15 mm | 0 s > .5 s |

Although preferred embodiments of this invention have been shown and described, it should be understood that various modifications and rearrangements of the parts may be resorted to without departing from the scope of the invention as disclosed and claimed herein.

What is claimed is:

1. A gas-fired combustion apparatus comprising a plenum chamber including a porous member having a combustion surface, a combustion chamber containing said combustion surface, air/fuel supply means for delivering a combustible air/fuel mixture to said plenum chamber, said combustible air/fuel mixture flowing through said porous member for combustion along said combustion surface in said combustion chamber with the formation of products of combustion, said combustion chamber being substantially sealed to minimize the entrance of secondary air relative to the amount of primary combustion air delivered by said air/fuel supply means, a discharge opening in fluid communication with said combustion chamber for venting the products of combustion to the environment, and pressure relief means for suppressing pressure fluctuations in said combustion chamber that occur during burner start-up.

2. The apparatus of claim 1, wherein said pressure relief means suppresses pressure increases in said combustion chamber upon burner start-up and thereby inhibiting non-uniform flow of the combustible air/fuel mixture through said porous member to said combustion surface.

3. The apparatus of claim 1, wherein said combustion chamber operates at subatmospheric pressure after burner start-up.

4. The apparatus of claim 1, wherein said pressure relief means comprises volume change means for temporarily increasing and decreasing the volume of said combustion chamber.

5. The apparatus of claim 4, wherein said combustion chamber includes a surrounding wall and said pressure relief means comprises a displaceable wall portion movable in response to pressure variations in said combustion chamber.

6. The apparatus of claim 5, wherein said displaceable wall portion is reciprocally movable in response to pressure variations in said combustion chamber.

7. The apparatus of claim 6, wherein said displaceable wall portion comprises a flexible membrane.

8. The apparatus of claim 7, wherein said flexible membrane comprises a polymer.

9. The apparatus of claim 8, wherein said polymer is a non-porous deformable material.

10. The apparatus of claim 9, wherein said non-porous deformable material is selected from the group consisting of butyl rubber, natural rubber, silicone rubber, vinyl polymers, urethane polymers, polyethylene plastic, teflon.

11. The apparatus of claim 10, wherein said non-porous deformable material is silicone rubber.

12. The apparatus of claim 5, wherein said surrounding wall comprises a top, a bottom, and a side wall, wherein said bottom wall is defined in part by said displaceable wall portion.

13. The apparatus of claim 1, wherein said combustion chamber includes a surrounding wall having an opening therethrough and said pressure relief means comprises a layer of porous material extending over said opening.

14. The apparatus of claim 13, wherein said porous material is a fibrous mat.

15. The apparatus of claim 14, wherein said fibrous mat is a glass-fiber bat.

16. The apparatus of claim 13, wherein said air/fuel supply means includes air duct means for delivery of air and fuel to said plenum chamber and said layer of porous material has a higher resistance to gas flow therethrough than said porous member and air duct means.

17. The apparatus of claim 16, wherein said air duct means is a venturi.

18. In a method of operating a gas-fired combustion apparatus having an air/fuel supply means for delivering a combustible air/fuel mixture to a porous combustion surface for combustion in a substantially sealed combustion chamber being in fluid communication with a flue stack open to the environment, said combustion chamber being substantially sealed to minimize the entrance of secondary air relative to the amount of primary air delivered by said air/fuel supply means, the improvement comprising suppressing pressure fluctuations in the combustion chamber that occur upon burner start-up.

19. The method of claim 18, including the steps of increasing the volume of the combustion chamber in response to pressure increases.

20. The method of claim 19, including the steps of decreasing the volume of the combustion chamber in response to pressure decreases.

21. The method of claim 20, wherein said volume increases and decreases are provided by displacing a diaphragm forming a combustion chamber wall portion.

22. The method of claim 18, including venting the combustion chamber through a porous wall portion having a resistance to gas flow therethrough selected to allow passage of products of combustion at relatively higher pressure but insufficient to allow gas flow therethrough due to the pressure differential between the environment and the relatively lower pressure in the combustion chamber.

23. The method of claim 22, wherein the porous wall portion has a resistance to gas flow therethrough greater than that of the porous combustion surface and air/fuel supply means.

* * * * *

UNITED STATES PATENT AND TRADEMARK OFFICE
CERTIFICATE OF CORRECTION

PATENT NO. : 5,435,716

DATED : July 25, 1995

INVENTOR(S) : John V. Joyce

It is certified that error appears in the above-identified patent and that said Letters Patent is hereby corrected as shown below:

Column 2, line 30, delete "No. 997,889" and insert --No. 997,899--.

Column 5, line 64, after "0.3" insert --mm.--.

Column 7, line 30, delete "12a" and insert --12a'--.

Column 7, line 57, after "13" insert a comma --,--.

Column 7, line 61, after "duct" insert --7--.

Column 9, line 60, delete "No. 997,889" and insert --No. 997,899--.

Column 9, line 63, delete "0,014" and insert --0.014--.

Signed and Sealed this

Nineteenth Day of December, 1995

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.  : 5,435,716
DATED       : July 25, 1995
INVENTOR(S) : John V. Joyce

It is certified that error appears in the above-indentified patent and that said Letters Patent is hereby corrected as shown below:

Title page, item [73] the following information should be inserted with respect to the assignee:

--Bowin Designs Pty. Ltd., Australia--.

Signed and Sealed this

Second Day of April, 1996

Attest:

BRUCE LEHMAN

Attesting Officer         Commissioner of Patents and Trademarks